United States Patent [19]
Cheng

[11] Patent Number: 6,064,567
[45] Date of Patent: *May 16, 2000

[54] PORTABLE COMPUTER HARD DISK DRIVE MOUNTING APPARATUS AND METHODS

[75] Inventor: Chen-Yu Cheng, Taipei, Taiwan

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/999,094

[22] Filed: Dec. 29, 1997

[51] Int. Cl.⁷ .................................. G06F 1/16; H05K 5/03
[52] U.S. Cl. .......................... 361/685; 360/137; 312/333
[58] Field of Search ..................... 361/685, 683, 361/681, 684; 360/137, 97.02, 99.07; 364/708.1; 312/333, 332.1

[56] References Cited

U.S. PATENT DOCUMENTS

| | | | |
|---|---|---|---|
| 5,126,954 | 6/1992 | Morita | 361/685 |
| 5,155,662 | 10/1992 | I-Shou | 361/685 |
| 5,311,455 | 5/1994 | Ho | 361/685 |
| 5,460,441 | 10/1995 | Hastings et al. | 361/685 |
| 5,526,226 | 6/1996 | Katoh et al. | 361/685 |
| 5,563,005 | 10/1996 | Ohtani et al. | 361/685 |
| 5,606,519 | 2/1997 | Viletto | 361/685 |
| 5,717,569 | 2/1998 | Jondrow | 361/684 |
| 5,717,571 | 2/1998 | Helot | 361/685 |
| 5,734,549 | 3/1998 | Oura | 361/685 |
| 5,740,012 | 4/1998 | Choi | 361/685 |
| 5,801,922 | 9/1998 | Shen et al. | 361/685 |

*Primary Examiner*—Leo P. Picard
*Assistant Examiner*—Lisa Lea-Edmonds
*Attorney, Agent, or Firm*—Konneker & Smith, P.C.

[57] ABSTRACT

To install a hard disk drive in a portable computer base housing, an upwardly opening well area is formed within the base housing and is sized to closely receive the disk drive. An electrical connector projects horizontally inwardly through one end of the well area and is operatively mateable with a corresponding connector on the front end of the disk drive. A flexible lowering strap is secured to the rear end of the disk drive. To install the disk drive, its front end is lowered into the well area while holding the strap to keep the rear end of the disk drive elevated. The strap is then used to controllably lower the balance of the disk drive into the well area to prevent installation shock to the disk drive that might occur if it were simply dropped into the well area. The lowered disk drive is then slid along the bottom of the well area to mate the well area and disk drive connectors. A clamping bar member is then extended along a rear top end portion of the installed disk drive and used to hold the disk drive firmly against the bottom side of the well area, thereby rigidly coupling the installed disk drive to the balance of the base housing in a manner eliminating the necessity of a separate shock and vibration isolation apparatus for the disk drive.

25 Claims, 2 Drawing Sheets

PORTABLE COMPUTER HARD DISK DRIVE MOUNTING APPARATUS AND METHODS

BACKGROUND OF THE INVENTION

1. Field of the Invention

The present invention generally relates to computer apparatus and, in a preferred embodiment thereof, more particularly relates to apparatus and methods for operatively installing a data storage module, such as a hard disk drive, in a base housing portion of a portable computer.

2. Description of Related Art

A data storage module such as a hard disk drive is conventionally installed in the base housing of a portable notebook computer by horizontally inserting the disk drive inwardly through an external housing side wall opening into an internal bay area in the housing until an electrical connector on the inner end of the disk drive is removably mated with a corresponding electrical connector located at the inner end of the bay area. An access door on the housing insertion opening is then closed to cover the opening behind the inserted disk drive.

As is well known, hard disk drives are susceptible to damage from shock loads imposed thereon, both during installation into the computer and during subsequent transport, handling and operation of the computer. Accordingly, it is typically necessary to provide the hard disk drive, when inserted into the computer housing in the above-described manner, with its own dedicated shock and vibration isolation structure within the computer to cushion it from shock and vibrational impact with adjacent structures within the computer. This provision of a separate shock and vibration isolation structure for the horizontally inserted disk drive is also typically necessary to reduce the flexure loads imposed on the connector structure by the inserted disk drive.

The conventional requirements of inserting a hard disk drive horizontally through an opening in the base housing of a portable computer, using a separate access door or plate structure to close off the opening after insertion of the disk drive, and providing the inserted disk drive with a dedicated shock and vibration isolation structure, undesirably add to the cost and complexity of the overall computer construction.

Accordingly, a need exists for improved apparatus and methods for operatively installing a data storage module, such as a hard disk drive, into a portable computer base housing. It is to this need which the present invention is directed.

SUMMARY OF THE INVENTION

In carrying out principles of the present invention, in accordance with a preferred embodiment thereof, a portable computer is provided which has a base housing having a top side in which a downwardly extending well is disposed, the well having an open top side that representatively underlies a keyboard structure removably carried on the top side of the base housing. A first electrical connector is supported adjacent a peripheral portion of the well, and representatively projects horizontally into the well.

A data storage module, preferably in the form of a hard disk drive, has a second electrical connector thereon and is downwardly received in the well with the second electrical connector being removably mated with the first electrical connector.

An installation member, representatively a flexible strap member, is carried by the disk drive in a spaced relationship with the second electrical connector and is useable to facilitate the lowering and raising of the disk drive respectively into and out of the well. A holding structure rigidly associates the disk drive with an adjacent portion of the base housing.

Illustratively, the second electrical connector is carried on a front end of the disk drive, the strap member is secured to and is extendable outwardly from a rear end of the disk drive, and the holding structure includes a clamping member removably secured to the base housing over a rear end portion of the disk drive and holding it in forcible engagement with an underlying bottom side portion of the well.

To easily and quickly install the disk drive in the base housing well, which closely receives the disk drive, the front end of the disk drive is lowered into the well to place the front disk drive end against the bottom well side with the first and second connectors in a facing relationship, while holding the installation strap to maintain the rear end of the disk drive in an elevated relationship with the bottom side of the well.

The installation strap is then used to controllably lower the elevated rear end of the disk drive into the well in a manner preventing the disk drive from being subjected to undesirable installation shock which might occur if the disk drive was simply dropped into the well. The lowered disk drive is then appropriately moved along the bottom side of the well to releasably and operatively mate the first and second electrical connectors. Finally, the clamping member is installed to rigidly associate the disk drive with the considerably larger mass of the overall base housing structure to protect the installed disk drive from operating shock and vibration loads without the necessity of providing the disk drive with a dedicated resilient shock and vibration isolation structure.

To subsequently remove the disk drive from the well, the clamping member is removed and the disk drive is moved along the bottom side of the well to uncouple the first and second electrical connectors. The installation strap member is then grasped and pulled upwardly to gently remove the uncoupled disk drive from the well.

BRIEF DESCRIPTION OF THE DRAWINGS

FIGS. 3A–3C are schematic cross-sectional views through the base housing well area, taken along line 33 of FIG. 2, and sequentially illustrate the installation of the disk drive in the well area using a flexible lowering member secured to the disk drive.

DETAILED DESCRIPTION

Figure 1:
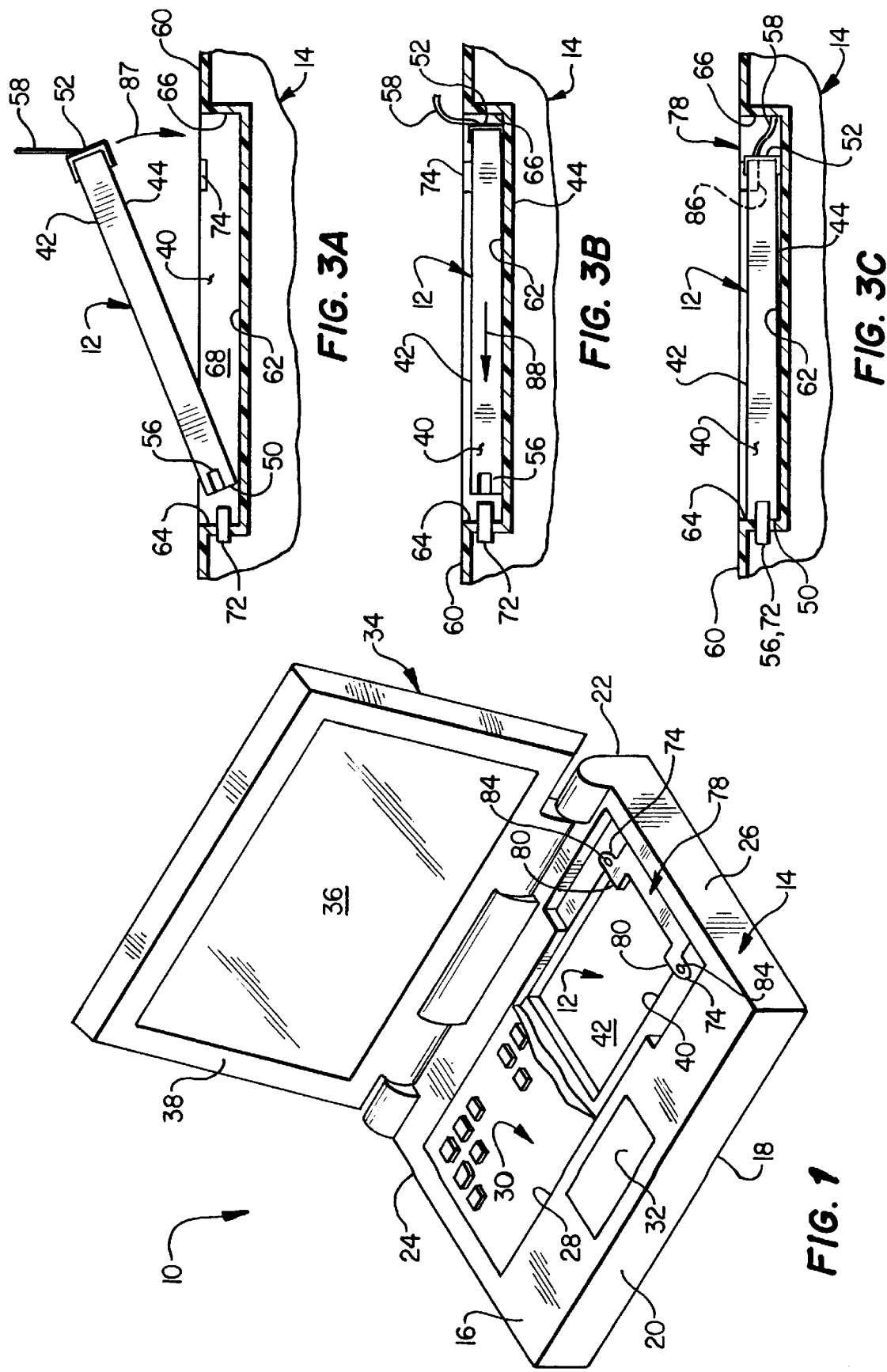
FIG. 1 is a simplified, partially cut away perspective view of a representative opened portable computer having a hard disk drive installed therein using apparatus and methods embodying principles of the present invention.

Perspectively illustrated in an opened configuration in FIG. 1 is a representative portable notebook computer 10 in which a data storage module, representatively a hard disk drive 12, is installed using principles of the present invention.

The computer 10, which is shown in a partially cut away and highly simplified form in FIG. 1, includes a rectangular base housing 14 having horizontal top and bottom walls 16 and 18, front and rear vertical side walls 20 and 22, and left and right vertical end walls 24 and 26. A cutout area 28 formed in the top wall 16 removably receives a suitable keyboard 30 positioned rearwardly adjacent a pointing device such as the illustrated touchpad structure 32.

Pivotally secured to a top rear edge portion of the base housing 14 is a lid housing 34 having a display screen 36 on its front or inner side 38. The lid housing 34 is pivotable relative to the base housing 14 between the indicated generally vertical open use orientation of the lid housing, and a downwardly pivoted horizontal storage and transport orientation (not shown) in which the lid housing is closed and overlies and covers the top side of the base housing 14. Suitable latch means (not illustrated) are provided to releasably hold the lid housing 34 in its closed storage and transport orientation.

Figure 2:
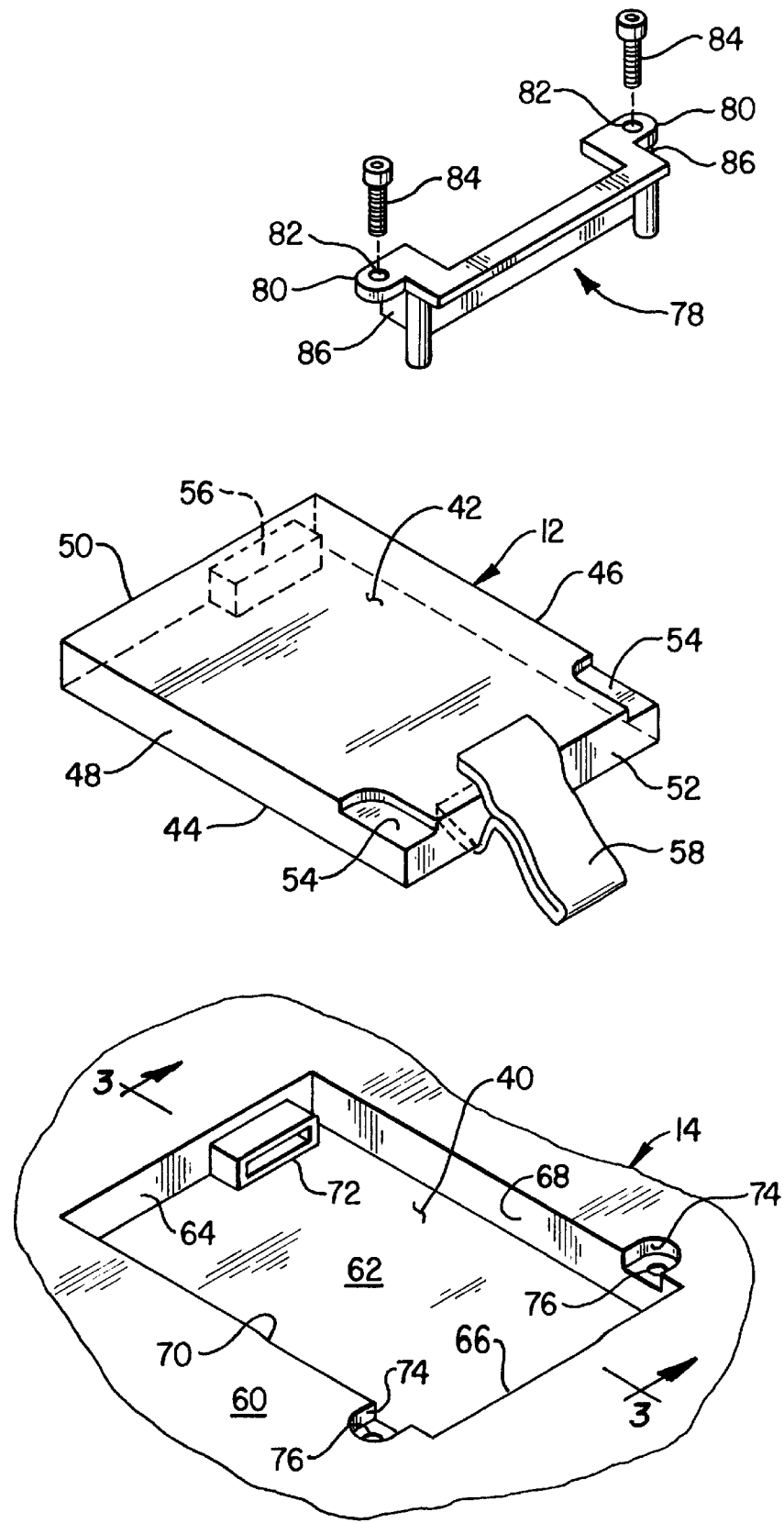
FIG. 2 is an enlarged scale exploded perspective view of the disk drive, a computer base housing well area that closely receives the disk drive, and a bracing member used in the installation of the disk drive in the well area.

Referring now to FIGS. 1 and 2, the hard disk drive 12 is mounted in a unique manner in an open-topped well area 40 formed in the base housing 14, disposed beneath the keyboard 30, and spaced inwardly apart from the side and end edge periphery of the base housing—representatively in a right rear corner portion of the base housing 14. As best illustrated in FIG. 2, the disk drive 12 is of a relatively thin, elongated rectangular configuration, having top and bottom sides 42 and 44, left and right side edges 46 and 48, and front and rear end edges 50 and 52.

For purposes later described herein, top side rear corner recesses 54 are formed in the disk drive 12, and a rearwardly recessed electrical connector 56 is carried on a front end edge portion of the disk drive. centrally mounted on a rear end edge portion of the disk drive 12 is an installation member which is representatively in the form of a flexible lowering strap member 58 that extends outwardly past the rear end edge 52 of the disk drive 12.

Still referring to FIG. 2, the open-topped well 40 is downwardly inset relative to an adjacent horizontal wall structure portion 60 of the base housing 14 and has a bottom side 62, upstanding opposite front and rear end wall portions 64 and 66, and upstanding opposite left and right side wall portions 68 and 70 (as viewed from the front of the well). An electrical connector 72, releasably mateable with the disk drive connector 56, extends rearwardly into the well 40 through its front end 64.

For purposes later described herein, a pair of recesses 74 are formed in the wall portion 60 the opposite sides 68,70 of the well 40 adjacent its rear end 66. Threaded openings 76 are formed in the bottom sides of the recesses 74.

In addition to the strap 58, the installation apparatus for the disk drive 12 also includes an elongated plastic clamping member 78 having opposite end portions 80 configured to be complementarily received in the wall recesses 74, the end portions 80 having openings 82 therein for receiving screws 84 that may be threaded into the recess openings 76. Disposed longitudinally inwardly of the end portions 80 are downwardly projecting engagement portions 86 which are downwardly receivable in the disk drive top side corner recesses 54 to bear against their bottom side surfaces as later described herein.

To reduce the overall interior base housing space that must be dedicated to the disk drive 12, the well 40 is sized to closely receive the disk drive 12. More specifically, the distance between the opposite sides 68,70 of the well 40 is just slightly greater that the distance between the opposite side edges 46,48 of the disk drive 12, and the distance between the opposite ends 64,66 of the well 40 are just sufficiently greater than the distance between the opposite end edges 50,52 of the disk drive 12 to compensate for the lengthwise portion of the well 40 taken up by its associated electrical connector 72 as later described herein.

With the lid housing 34 pivoted upwardly away from its closed orientation, and the keyboard 30 removed from its associated cutout area 28, the disk drive 12 is operatively installed in the well area 40 as will now be described in conjunction with FIGS. 2 and 3A–3C.

First, as depicted in FIG. 3A, with the installer holding the strap 58 a front end edge portion of the disk drive 12 is lowered into the well area 40 until it contacts the bottom side portion 62 of the well area 40. At this point, the disk drive connector 56 faces the well area connector 72, with the disk drive 12 being held in its illustrated upwardly and rearwardly sloped orientation by the strap 58.

Next, as schematically depicted in FIG. 3A by the arrow 87, using the strap 58 the installer controllably lowers the balance of the disk drive 12 onto the bottom side of the well area 40 (see FIG. 3B) in a manner protecting the disk drive 12 from installation shock that might otherwise occur if it was simply dropped into the well 40 that closely receives it. Then, as indicated by the arrow 88 in FIG. 3B, the lowered disk drive 12 is forcibly moved forwardly (i.e., leftwardly) along the bottom side 62 of the well area 40 to releasably mate the connectors 56,72 as shown in FIG. 3C.

Finally, the clamping member 78 (see FIGS. 1 and 3B) is installed by placing it above a rear top side portion of the disk drive 12 in a manner such that (1) the clamping member end portions 80 are complementarily received in the underlying wall recesses 74 (see FIG. 2), and (2) the clamping member engagement portions 86 rest atop underlying top rear portions of the disk drive 12.

Screws 84 are then inserted downwardly through the clamping member end openings 82 and tightened into the underlying wall openings 76 (see FIG. 2) to thereby firmly clamp a rear end edge portion of the installed disk drive 12 against the bottom side portion 62 of the well area 40. This, in effect, rigidly locks the installed disk drive to the overall base portion of the computer 12 in a manner tending to protect the disk drive from operational shocks (by fixedly associating it with the much larger mass of the overall computer base portion) without the necessity of providing the disk drive with its own dedicated resilient shock absorbing structure. After installation of the disk drive 12, the keyboard 30 is installed in its associated recess 28.

By using the simple apparatus and installation technique just described, the disk drive 12 is easily and quickly placed in the base housing 14 (1) without providing an exterior vertical side wall opening in the base housing 14 and an associated cover plate or door, (2) without providing a dedicated resilient operating shock and vibration isolation structure for the disk drive, and (3) without subjecting the disk drive to undesirable installation shock that otherwise might be caused by simply dropping it into its associated well area.

The disk drive 12 which was easily and quickly installed in the well area 40 in an essentially shock-free manner is also easily and quickly removable from the well 40 by simply removing the keyboard 30 and the clamping member 78, sliding the disk drive 12 rearwardly along the bottom well side 62 to uncouple the connectors 56 and 72, and then lifting the uncoupled disk drive 12 out of the well 40 using the lowering strap 58.

While the installation apparatus and method just described is particularly well suited to installing a hard disk drive into the base housing of a portable computer, it will be readily appreciated by those of skill in this particular art that similar apparatus and methods could also be advantageously employed in conjunction with other types of electronic apparatus using other types of data storage modules.

The foregoing detailed description is to be clearly understood as being given by way of illustration and example only, the spirit and scope of the present invention being limited solely by the appended claims.

What is claimed is:

1. A method of installing a data storage module, for example a hard disk drive, in a computer housing, said data storage module having a first edge portion with an electrical connector thereon, and an opposite second edge portion spaced apart from said first edge portion, said method comprising the steps of:

forming a well area in said computer housing, said well area having a bottom portion and being adjacent a second electrical connector mateable with said first electrical connector;

securing an installation member to said second edge portion of said data storage module, said installation member being liftable to responsively cause said data storage module to tilt downwardly away from said installation member and place said first edge portion at a lower elevation than said second edge portion;

lowering said first data storage module edge portion into said well area, in a manner positioning said first data storage module edge portion atop said bottom well area portion, while holding said installation member to maintain said second data storage module edge portion in an elevated relationship with said bottom well area portion and said first data storage module edge portion;

using said installation member to controllably lower the elevated second data storage module edge portion onto said bottom well area portion to protect said data storage module from installation shock damage; and operatively mating said first and second electrical connectors by moving said data storage module along said bottom well area portion.

2. The method of claim 1 wherein:

said computer housing has a top side, and said forming step includes the step of providing said well area with a top opening.

3. The method of claim 2 wherein:

said computer housing has a side edge periphery, and said forming step includes the step of positioning said well area inwardly of said side edge periphery.

4. The method of claim 2 wherein:

said computer housing has a keyboard structure extending along said top side thereof, and said forming step includes the step of positioning said well area beneath the level of said keyboard structure.

5. The method of claim 1 wherein said forming step includes the step of configuring said well area to closely receive the data storage module.

6. The method of claim 1 wherein said securing step is performed using a flexible installation member.

7. The method of claim 6 wherein said securing step is performed using a lowering strap member.

8. The method of claim 1 further comprising the step of protecting the data storage module from operating shock by rigidly associating a portion of the data storage module with an adjacent portion of said computer housing.

9. The method of claim 8 wherein said protecting step is performed by clamping a portion of the data storage module against a portion of said well area.

10. The method of claim 9 wherein:

said well area has a bottom side portion, and said protecting step is performed by clamping a portion of the data storage member against said bottom side portion of said well area.

11. The method of claim 10 wherein:

said protecting step is performed by clamping said second edge portion of the data storage module against said bottom side portion of said well area.

12. A data storage module comprising:

a first edge portion;

a second edge portion spaced apart from and generally opposite from said first edge portion;

an electrical connector carried on said first edge portion; and an installation member secured to and projecting outwardly from said second edge portion, said installation member being liftable to responsively cause said data storage module to tilt downwardly away from said installation member and place said first edge portion at a lower elevation than said second edge portion to facilitate the tilting placement of said data storage module, first edge portion first, into a receiving well area.

13. The data storage module of claim 12 wherein said data storage module is a hard disk drive.

14. The data storage module of claim 12 wherein said installation member is formed from a flexible material.

15. The data storage module of claim 14 wherein said installation member is a strap member.

16. A hard disk drive for a computer, comprising:

first and second opposite edge portions;

an electrical connector carried by said first edge portion; and a flexible installation member carried by and extendable outwardly beyond said second edge portion, said flexible installation member being liftable to responsively cause said first edge portion to tilt downwardly away from said installation member to an elevation lower than that of said second edge portion to facilitate the tilting placement of said hard disk drive, first edge portion first, into a computer receiving well area.

17. A portable computer comprising:

a base housing having a top side in which a downwardly extending well is disposed;

a first electrical connector disposed adjacent a peripheral portion of said well;

a data storage module having a first end portion with a second electrical connector thereon, and a second end portion opposite said first end portion, said data storage module being downwardly received in said well with said second electrical connector being removably mated with said first electrical connector;

an installation member secured to said second end portion of said data storage module and being useable to facilitate the lowering and raising of said data storage module respectively into and out of said well, said installation member being liftable to responsively cause said data storage module to tilt downwardly away from said installation member and place said first edge portion at a lower elevation than said second edge portion; and a holding structure rigidly clamping said data storage module against an adjacent portion of said base housing.

18. The portable computer of claim 17 wherein said portable computer is a notebook computer.

19. The portable computer of claim 17 wherein said data storage module is a disk drive.

20. The portable computer of claim 19 wherein said disk drive is a hard disk drive.

21. The portable computer of claim 17 wherein said installation member is of a flexible material.

22. The portable computer of claim 21 wherein said installation member is a strap member.

23. The portable computer of claim 17 wherein said holding structure clamps said data storage module against a bottom side portion of said well.

24. The portable computer of claim 23 wherein said holding structure includes:

a clamping member overlying and engaging a portion of said data storage module spaced apart from said second electrical connector, and means for removably securing said clamping member to a portion of said base housing in a manner causing said clamping member to forcibly hold said data storage member against said bottom side portion of said well.

25. The portable computer of claim 17 further comprising a keyboard structure removably mounted on said top side of said base housing and overlying said well.

* * * * *